US011153123B2

(12) United States Patent
Yuan et al.

(10) Patent No.: US 11,153,123 B2
(45) Date of Patent: Oct. 19, 2021

(54) SYSTEM AND METHOD FOR PROVIDING FIRST ARRIVAL PATH (FAP) AND DELAY SPREAD ESTIMATION (DSE) IN WIRELESS COMMUNICATION SYSTEM

(71) Applicant: Samsung Electronics Co., Ltd., Suwon-si (KR)

(72) Inventors: Bofeng Yuan, Carlsbad, CA (US); Hongbing Cheng, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/688,866

(22) Filed: Nov. 19, 2019

(65) Prior Publication Data

US 2021/0058273 A1    Feb. 25, 2021

Related U.S. Application Data

(60) Provisional application No. 62/888,827, filed on Aug. 19, 2019.

(51) Int. Cl.
*H04W 4/00* (2018.01)
*H04L 25/02* (2006.01)
*H04B 17/336* (2015.01)
*H04B 1/7113* (2011.01)

(52) U.S. Cl.
CPC ........ *H04L 25/0216* (2013.01); *H04B 1/7113* (2013.01); *H04B 17/336* (2015.01); *H04L 25/022* (2013.01); *H04L 25/0256* (2013.01)

(58) Field of Classification Search
None
See application file for complete search history.

(56) References Cited

U.S. PATENT DOCUMENTS

| 6,765,969 | B1 | 7/2004 | Vook et al. |
| 8,848,764 | B2 | 9/2014 | Panicker et al. |
| 9,219,629 | B1 | 12/2015 | Sun et al. |
| 2009/0141819 | A1* | 6/2009 | Hojen-Sorensen ........... H04L 25/0232 375/260 |
| 2010/0172399 | A1 | 7/2010 | Krishnamurthy et al. |
| 2010/0226423 | A1* | 9/2010 | Chen ................. H04L 25/03019 375/232 |
| 2011/0007829 | A1 | 1/2011 | Kumar et al. |
| 2012/0195397 | A1 | 8/2012 | Sayana et al. |
| 2012/0320961 | A1 | 12/2012 | Pham et al. |
| 2013/0322586 | A1* | 12/2013 | Tabet ................. H04L 25/0256 375/350 |

(Continued)

FOREIGN PATENT DOCUMENTS

WO    2017/153079 A1    9/2017

*Primary Examiner* — Clemence S Han
(74) *Attorney, Agent, or Firm* — Lewis Roca Rothgerber Christie LLP

(57) ABSTRACT

A method for minimizing a time domain mean square error (MSE) of channel estimation (CE) includes estimating, by a processor, a power delay profile (PDP) from a time domain observation of reference signal (RS) channels; estimating, by the processor, a noise variance of the RS channels; and determining, by the processor, a first arrival path (FAP) value and a delay spread estimation (DSE) value based on the estimated PDP and the estimated noise variance for minimizing the MSE of CE.

20 Claims, 8 Drawing Sheets

(56) References Cited

U.S. PATENT DOCUMENTS

| | | |
|---|---|---|
| 2014/0098704 A1 | 4/2014 | Wang |
| 2014/0241470 A1* | 8/2014 | Kato .................. H04L 27/2649 |
| | | 375/340 |
| 2015/0229493 A1* | 8/2015 | Lee .................... H04L 25/0256 |
| | | 370/252 |
| 2016/0337105 A1 | 11/2016 | Lawton et al. |
| 2017/0288759 A1 | 10/2017 | Namgoong et al. |
| 2018/0013592 A1* | 1/2018 | Liu ...................... H04L 25/022 |
| 2018/0026764 A1* | 1/2018 | Namgoong ........... H04L 5/0048 |
| | | 370/329 |
| 2019/0097843 A1 | 3/2019 | Obara et al. |
| 2019/0103996 A1 | 4/2019 | Lime et al. |

\* cited by examiner

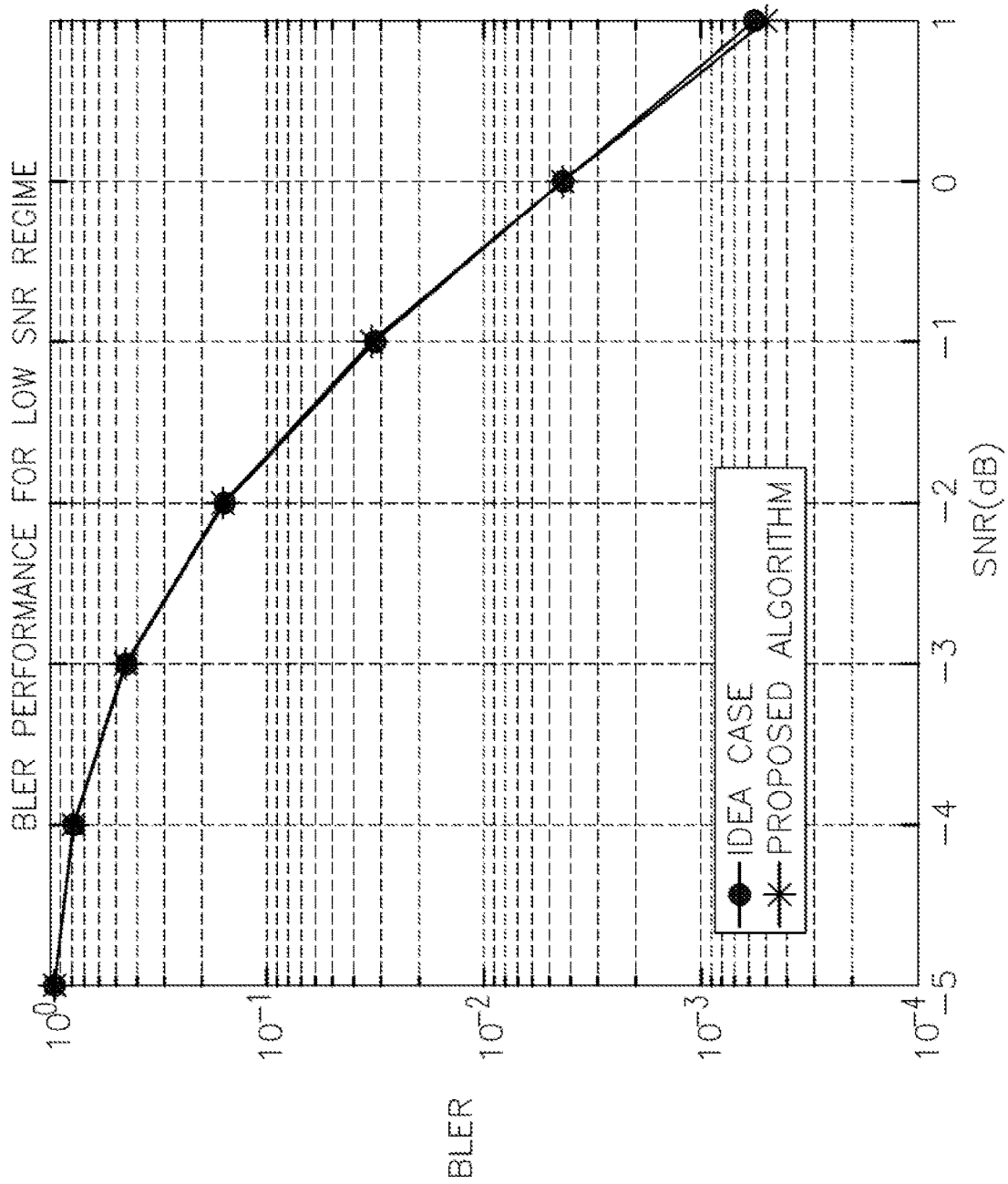

SYSTEM AND METHOD FOR PROVIDING FIRST ARRIVAL PATH (FAP) AND DELAY SPREAD ESTIMATION (DSE) IN WIRELESS COMMUNICATION SYSTEM

CROSS-REFERENCE TO RELATED APPLICATION(S)

The present application claims priority to and the benefit of U.S. Provisional Patent Application Ser. No. 62/888,827, filed Aug. 19, 2019 and entitled "SYSTEM AND METHOD FOR PROVIDING FIRST ARRIVAL PATH (FAP) AND DELAY SPREAD ESTIMATION (DSE) IN WIRELESS COMMUNICATION SYSTEM," the entire content of which is hereby expressly incorporated by reference.

FIELD

The present disclosure generally relates to a wireless communication system. In particular, the present disclosure relates to a system and a method for providing first arrival path (FAP) and delay spread estimation (DSE) in a wireless communication system.

BACKGROUND

In $5^{th}$ generation (5G) new radio (NR) radio access technology (RAT), if the reference signal (RS) observation is limited to a narrow band (e.g., a physical downlink shared channel (PDSCH) demodulation reference signal (DMRS)), a frequency domain (FD) minimum mean square error (MMSE) filter is used for de-noising in channel estimation (CE). This may be referred to as FD-MMSE CE or narrow band CE. In order to obtain the weight matrix of FD-MMSE, the frequency correlation between RS channels and data resource element (RE) channels, as well as the frequency auto correlation of RS channels need to be calculated. Theoretically, the frequency correlation is calculated as the discrete Fourier transform (DFT) of power delay profile (PDP). Due to hardware complexity, the frequency correlation function may be calculated based on uniform PDP with length equal to the delay spread value provided by delay spread estimation (DSE) block. Therefore, the delay spread estimation (DSE) may be utilized for channel estimation (CE).

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a system and method for providing first arrival path (FAP) and delay spread estimation (DSE) in wireless communication system. According to an embodiments of the present disclosure, a method for minimizing a time domain mean square error (MSE) of channel estimation (CE) includes estimating, by a processor, a power delay profile (PDP) from a time domain observation of reference signal (RS) channels; estimating, by the processor, a noise variance of the RS channels; and determining, by the processor, a first arrival path (FAP) value and a delay spread estimation (DSE) value based on the estimated PDP and the estimated noise variance for minimizing the MSE of CE.

In one embodiment of the present disclosure, the time domain MSE is:

$$MSE = 1 + \frac{L\sigma^2}{(1+L\sigma^2)^2} + \left[\frac{1}{(1+L\sigma^2)^2} - \frac{2}{1+L\sigma^2}\right]\sum_{i=F}^{L+F-1} P_i \quad (1)$$

wherein F and L are integers, where:

$$1 \le L \le \frac{3N}{4},$$
$$-\frac{N}{4} \le F \le \frac{N}{4}.$$

wherein, $\sigma^2$ is the noise variance, $P_i$ is power of the i-th channel tap or the uniform PDP, F is first arrival path (FAP) index, N is a length of the estimated PDP, and L is a length of the uniform PDP.

In one embodiment of the present disclosure, determining the FAP value and the DSE value to minimize the time domain MSE includes determining, by the processor, a value of F and a value of L, wherein a minimum value of the time domain MSE is determined based on the value of F and the value of L.

In one embodiment of the present disclosure, the value of L is the delay spread value for minimizing the MSE and the estimated noise variance is capped at a signal to noise ratio (SNR)=20 dB. In one embodiment of the present disclosure, the determining the value of F and the value of L for minimizing the time domain MSE includes assigning, by the processor, a value "0" to the FAP index F; determining, by the processor, a minimized value of MSE and corresponding value of L for each F of a plurality of F values within $$-\frac{N}{4} \le F < 0 \text{ and } 0 < F \le \frac{N}{4};$$

and determining, by the processor, the value of F and the value of L based on comparing minimized values of MSE for the plurality of F values within $$-\frac{N}{4} \le F < 0 \text{ and } 0 < F \le \frac{N}{4}.$$

In one embodiment of the present disclosure, the value of F and the value of L correspond to a minimum value of MSE from among the minimized values of MSE for the plurality of F values within $$-\frac{N}{4} \le F < 0 \text{ and } 0 < F \le \frac{N}{4},$$

wherein the minimized values of MSE and the corresponding values of L are determined using equation (1). In one embodiment of the present disclosure, the method further includes stopping a search of the value of F and the value of L for F>0 or F<0, by the processor, in response to the minimized value of MSE, for F within $$-\frac{N}{4} \leq F < 0 \text{ or } 0 < F \leq \frac{N}{4},$$

being increased as |F| increased for n consecutive times, wherein the n is 5.

In one embodiment of the present disclosure, the method further includes scaling, by the processor, the value of F and the value of L based on a difference of sampling time between the RS channels and data resource elements (REs) to determine a scaled value of F and a scaled value of L. In one embodiment of the present disclosure, the scaled value of F is F', wherein F'=scaling factor×F, and the scaled value of L is L', wherein L'=scaling factor×L, wherein $$\text{scaling factor} = \frac{\text{Sample duration of } RSPDP}{\text{Sample duration of data } REs} = \frac{N_{IFFT} \times \Delta f}{N_{PDP} \times \Delta f \times \frac{12}{\rho}},$$

wherein $N_{IFFT}$ is a size of Fast Fourier Transform (FFT), $N_{PDP}$ is a length of the estimated PDP, $\Delta f$ is a subcarrier spacing, and $\rho$ is a density of RS REs.

In one embodiment of the present disclosure, the method further includes determining, by the processor, CE and a frequency correlation between the RS channels and the data REs, based on F' and L'.

In one embodiment of the present disclosure, a system for minimizing a time domain mean square error (MSE) of channel estimation (CE) includes a memory and a processor in communication with the memory, wherein the processor is configured to: estimate a power delay profile (PDP) from time domain observation of reference signal (RS) channels; estimate a noise variance of the RS channels; and determine a first arrival path (FAP) value and a delay spread estimation (DSE) value based on the estimated PDP and the estimated noise variance for minimizing the MSE of CE.

In one embodiment of the present disclosure, the time domain MSE is:

$$MSE = 1 + \frac{L\sigma^2}{(1+L\sigma^2)^2} + \left[\frac{1}{(1+L\sigma^2)^2} - \frac{2}{1+L\sigma^2}\right] \sum_{i=F}^{L+F-1} P_i \quad (1)$$

wherein F and L are integers, where:

$$1 \leq L \leq \frac{3N}{4},$$

$$-\frac{N}{4} \leq F \leq \frac{N}{4}.$$

wherein, $\sigma^2$ is the noise variance, $P_i$ is power of the i-th channel tap or the uniform PDP, F is first arrival path (FAP) index, N is a length of the estimated PDP, and L is a length of the uniform PDP.

In one embodiment of the present disclosure, the processor is further configured to: determine the FAP value and the DSE value to minimize the time domain MSE based on determining a value of F and a value of L, wherein the processor is further configured to determine a minimum value of the time domain MSE based on the value of F and the value of L. In one embodiment of the present disclosure, the value of L is the delay spread value for minimizing the MSE and the estimated noise variance is capped at a signal to noise ratio (SNR)=20 dB. In one embodiment of the present disclosure, the processor is further configured to: assign a value "0" to the FAP index F; determine a minimized value of MSE and corresponding value of L for each F of a plurality of F values within $$-\frac{N}{4} \leq F < 0 \text{ and } 0 < F \leq \frac{N}{4};$$

and determine the value of F and the value of L based on comparing minimized values of MSE for the plurality of F values within $$-\frac{N}{4} \leq F < 0 \text{ and } 0 < F \leq \frac{N}{4}.$$

In one embodiment of the present disclosure, the value of F and the value of L correspond to a minimum value of MSE from among the minimized values of MSE for the plurality of F values within $$-\frac{N}{4} \leq F < 0 \text{ and } 0 < F \leq \frac{N}{4},$$

wherein the minimized values of MSE and the corresponding values of L are determined using equation (1). In one embodiment of the present disclosure, the processor is further configured to stop a search of the value of F and the value of L for F>0 or F<0, by the processor, in response to the minimized value of MSE, for F within $$-\frac{N}{4} \leq F < 0 \text{ and } 0 < F \leq \frac{N}{4},$$

being increased as increased for n consecutive times, wherein the n is 5.

In one embodiment of the present disclosure, the processor is further configured to scale the value of F and the value of L based on a difference of sampling time between RS channels and data resource elements (REs) to determine a scaled value of F and a scaled value of L. In one embodiment of the present disclosure, the scaled value of F is F', wherein F'=scaling factor×F, and the scaled value of L is L', wherein L'=scaling factor×L, wherein $$\text{scaling factor} = \frac{\text{Sample duration } RS\ PDP}{\text{Sample duration of data } REs} = \frac{N_{IFFT} \times \Delta f}{N_{PDP} \times \Delta f \times \frac{12}{\rho}},$$

wherein $N_{IFFT}$ is a size of Fast Fourier Transform (FFT), $N_{PDP}$ is a length of the estimated PDP, $\Delta f$ is a subcarrier spacing, and $\rho$ is a density of RS REs.

In one embodiment of the present disclosure, the processor is further configured to determine CE and a frequency correlation between RS channels and data REs, based on F' and L'.

BRIEF DESCRIPTION OF THE DRAWINGS

These and other features of some example embodiments of the present disclosure will be appreciated and understood with reference to the specification, claims, and appended drawings, wherein:

FIG. 6 illustrates the block error rate (BLER) performance in low SNR regime, according to one example embodiment of the present disclosure.

DETAILED DESCRIPTION

Figure 1A:
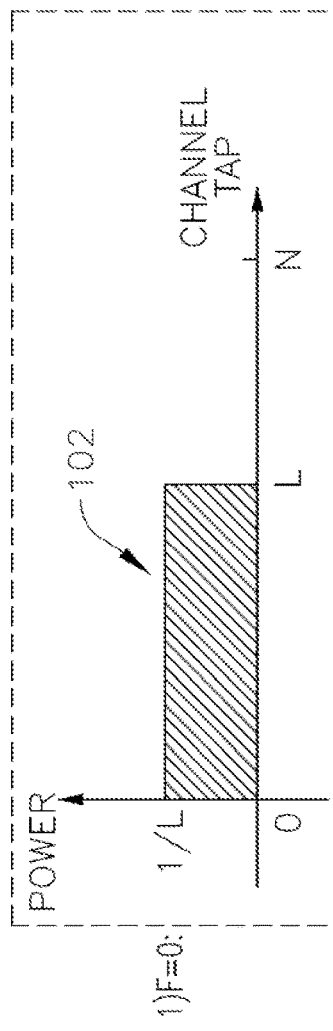
FIGS. 1A-1C illustrate uniform PDP of a fixed length, according to one example embodiment of the present disclosure.

The detailed description set forth below in connection with the appended drawings is intended as a description of some example embodiments of a system and method for providing first arrival path (FAP) and delay spread estimation (DSE) in wireless communication system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In $5^{th}$ generation (5G) new radio (NR), if the reference signal (RS) observation is limited to a narrow band (e.g., a physical downlink shared channel (PDSCH) demodulation reference signal (DMRS)), a frequency domain MMSE filter is used for de-noising in channel estimation (CE), which may be referred to FD-MMSE CE or narrow band CE. In order to obtain the weight matrix of FD-MMSE, the frequency correlation between RS channels and data resource element (RE) channels, as well as the frequency auto correlation of RS channels may be calculated. Frequency correlation may be determined as the discrete Fourier transform (DFT) of PDP. Due to hardware complexity, the frequency correlation function may be calculated based on a uniform PDP defined by the first arrival path (FAP) and the delay spread value provided by the DSE block. Therefore, the FAP and the delay spread estimation may be utilized for channel estimation (CE).

The present disclosure provides an example estimation method to measure the FAP and the delay spread (e.g., "the example method," or "the example method for delay spread estimation (DSE) and measuring FAP," or "the example method and system for DSE and measuring FAP," or "the example method and system for DSE"), using the estimated PDP and noise variance (e.g., an estimated noise variance).

In some cases, a typical method may be based on path searching with given FAP and last arrival path (LAP) threshold. However, the estimated LAP index in such a method may suffer from the high fluctuation of the PDP in low SNR regime, which may impact the CE performance (e.g., may not optimize the CE performance). The present system and method provides the FAP and an optimized delay spread value (e.g., based on the estimated PDP and the estimated noise variance) that may lower (e.g., minimize) the mean square error (MSE) of channel estimation (CE) in response to a uniform PDP being used for frequency domain-minimum mean square error (FD-MMSE) CE. For example, the FAP and delay spread value may be optimized such that the MSE between the estimated channels and the ideal channels may be lowered or minimized in time domain. In some cases, different embodiments of the example method and system for DSE may perform better than some alternative methods (e.g., path searching based DSE methods), for example, in low SNR regime.

In the embodiments of the example method and system for DSE of the present disclosure, PDP calculated by the channel state information reference signal (CSI-RS) for tracking (TRS) may be used to acquire delay spread estimation of the present disclosure. In embodiments of the example method and system for DSE of the present disclosure, the PDP estimated using a synchronization signal (SS) block (physical broadcast channel (PBCH) DMRS/SSS) and a physical downlink shared channel (PDSCH) DMRS may also be used for DSE when the TRS is absent.

Embodiments of the example method and system for DSE of the present disclosure may enable estimating the delay spread based on PDP and noise variance estimated from the wideband reference signal, such as TRS, PBCH DMRS as mentioned before. In embodiments of the example method and system for DSE of the present disclosure, since the frequency correlation function is the fast Fourier transform (FFT) of PDP, the FD-MMSE weight matrix may be interpreted in time domain. The delay spread value may be optimized subsequently, to lower (or minimize) the mean square error (MSE) between the estimated channels and the ideal channels, in time domain. In one embodiment, the optimality of the delay spread may be achieved, for example, by assuming infinite taps in frequency domain to implement FD MMSE CE (e.g., in practice only 6 taps are used). Even with such an assumption, the embodiments of the example method and system for DSE of the present disclosure may perform relatively close to the ideal case (e.g., calculating frequency correlation with ideal PDP), and therefore, may improve low SNR performance compared to the alternative methods. In addition, the time domain operation of the embodiments of the example method and system for DSE of the present disclosure may reduce the complexity compared to a direct optimization in frequency domain.

A system model for the implementation of the embodiments of the example method and system for DSE of the present disclosure to estimate the delay spread based on the PDP and the noise variance estimated from the wideband reference signal, such as TRS, PBCH DMRS, as mentioned before, is described in the following paragraphs.

In frequency domain, if it is assumed that $p_f$ is the vector of the channels for RS REs, and y is the observation of these RS channels, y may be represented as:

$$y = h_p + z, \quad (1)$$

In equation (1), z is the vector of the background noise, which is assumed to be independent to the RS channels, $h_p = [h_{p1}, h_{p2}, \ldots, h_{pN}]^T$ and of zero-mean and covariance $\sigma^2 I$. If it is assumed that h is the vector of the channels for all REs within the same symbol that are to be estimated, then, the linear minimum mean square error (LMMSE) solution for the estimate of $h = [h_1, h_2, \ldots, h_M]^T$ may be represented as:

$$\hat{h} = R_{dp}(R_{pp} + \sigma^2 I)^{-1} y, \quad (2)$$

In equation (2), $R_{dp}$ is the frequency correlation matrix between h and $h_p$, and $R_{pp}$ is the frequency auto-correlation matrix of $h_p$; I is the identity matrix of size equal to the length of $h_p$.

In some cases, frequency correlation may depend only on the frequency domain distances. Also, in some cases, the correlation between channels $h_i$ and $h_{pk}$ may satisfy the following relationship:

$$R_{dp}{}^{[i,k]} = E[h_i h_{pk}{}^*] = r_f(i-k), \quad (3)$$

Given the estimated PDP of channel, the frequency correlation function $r_f(\cdot)$ may be represented as:

$$r_f(k) = \sum_{i=0}^{N-1} P_i e^{-j2\pi k \Delta f \tau_i}, \quad (4)$$

In equation (4), N may be the length of the PDP, $P_i$ and $x_i$ may be the power and delay of the i-th channel tap, respectively, k may be the frequency distance of two channels, and $\Delta f$ may be the subcarrier spacing.

In some cases, directly calculating the frequency correlation with real PDP may be challenging due to hardware complexity. However, the frequency correlation may be simplified by assuming a uniform PDP with length N and non-zero entries from index F to F+L−1, i.e., a PDP with non-zero entries $\{P_i'\}$, $\forall i \in \{F, F+1, \ldots, F+L-1\}$ where:

$$P_i' = \begin{cases} 1/L, & F \leq i \leq F+L-1 \\ 0, & \text{otherwise} \end{cases} \quad (5)$$

In equation (5), F and L are integers $$F \in \left\{-\frac{N}{4}, \ldots, \frac{N}{4}\right\}, L \in \left\{1, \ldots, \frac{3N}{4}\right\}.$$

In equation (5), the total length of the uniform PDP may be N (N may not be related to delay spread), however only L (e.g., delay spread) taps may be non-zero. Also, in equation (5), F may be the FAP index. In example embodiments of the present disclosure, a uniform PDP may be defined by the FAP and the delay spread value.

In some cases, based on the above mentioned assumptions, the frequency correlation function $\hat{r}_f(\cdot)$ may satisfy the following condition:

$$\hat{r}_f(k, L, F) = \sum_{i=F}^{F+L-1} P_i' e^{-j2\pi k \Delta f \tau_i} = \sum_{i=F}^{F+L-1} \frac{1}{L} e^{-j2\pi ki/N_{fft}} \quad (6)$$

Therefore, the correlation matrix and the auto-correlation matrix calculated by (6) may be $\hat{R}_{dp}$ and $\hat{R}_{pp}$, and the estimated channel based on the uniform PDP may be represented as:

$$\hat{h}' = \hat{R}_{dp}(\hat{R}_{pp} + \sigma^2 I)^{-1} y \quad (7)$$

By utilizing the embodiments of the example method and system for DSE of the present disclosure, given any PDP, the optimal uniform PDP may reduce or minimize the MSE between the estimated channel (6) and the ideal channel, which may be represented as:

$$\underset{F,L}{\mathrm{argmin}} E\left\{(\hat{h}' - h)^H (\hat{h}' - h)\right\} \quad (8)$$

With the above approximation, the optimization problem in (8) may be represented as the following optimization problem:

$$\underset{F,L}{\mathrm{argmin}} 1 + \frac{L\sigma^2}{(1+L\sigma^2)^2} + \left[\frac{1}{(1+L\sigma^2)^2} - \frac{2}{1+L\sigma^2}\right] \sum_{i=F}^{L+F-1} P_i \quad (9)$$

s.t.

$$1 \leq L \leq \frac{3N}{4},$$

$$-\frac{N}{4} \leq F \leq \frac{N}{4}.$$

In equation (9), it may be assumed that uniform PDP is circular symmetric, so for a negative F, $P_F = P_{F+N}$. In equation (9), "N" may be the length of the PDP (e.g., not uniform PDP) used in CE and also the input of the example method and system for DSE of the present disclosure. N is a fixed number and may not be changed in the embodiments of the example method and system for DSE of the present disclosure. In the embodiments of the example method and system for DSE of the present disclosure, a uniform PDP with L non-zero value taps may be used to mimic the real PDP with length N. Because N>>L, the uniform PDP may have length N in order to be used in CE. In one the embodiment of the example method and system for DSE of the present disclosure, zero-value taps may be added.

Figure 1B:
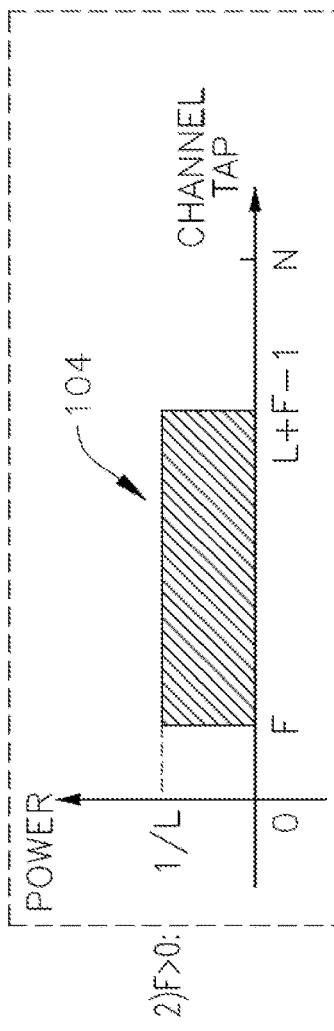
Figure 1C:
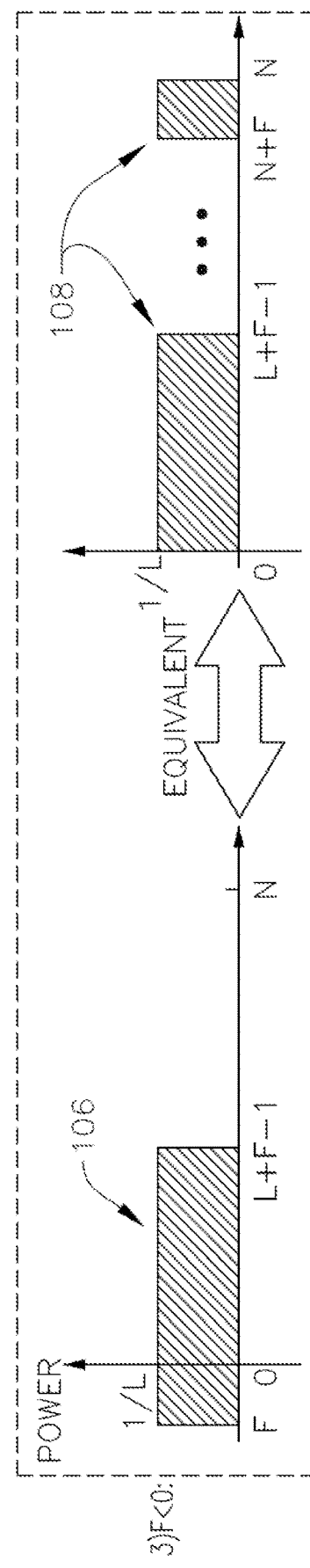

For example, FIGS. 1A-1C illustrate the uniform PDP for F=0, F>0, and F<0 and different ranges of N. For example, in FIG. 1A, the value of the first uniform PDP 102 for non-zero taps is 1/L (as discussed with respect to equation (5)). In FIG. 1A, tap 0~L are non-zero taps and tap L+1~N are zero taps. The length of the first uniform PDP 102 is L. For example, in FIG. 1B, the value of the second uniform PDP 104 for non-zero taps is 1/L (as discussed with respect to equation (5)). In FIG. 1B, tap F~L+F−1 are non-zero taps and tap 0~F and tap L+F−1~N are zero taps. The length of the second uniform PDP 104 is L. For example, in FIG. 1C, the value of the third uniform PDP 106 for non-zero taps is 1/L (as discussed with respect to equation (5)). In FIG. 1C, tap F~L+F−1 (F<0) are non-zero taps and tap L+F−1~N are zero taps. The length of the third uniform PDP 106 is L. The fourth uniform PDP 108 may be an equivalent representation of the third uniform PDP 106.

In terms of hardware implementation, the complexity of calculating a metric of equation (9) may be further simplified as follows (e.g., to reduce the complexity involved in performing division in hardware or processor):

$$\operatorname{argmin}_{F,L} 1 + \frac{L\sigma^2}{(1+L\sigma^2)^2} + \left[\frac{1}{(1+L\sigma^2)^2} - \frac{2}{1+L\sigma^2}\right] \sum_{i=F}^{L+F-1} P_i = \quad (10)$$

$$\operatorname{argmin}_L \alpha + \left[\alpha L\sigma^2 - (2-\alpha) \sum_{i=F}^{L+F-1} P_i\right],$$

$$\alpha = \frac{P_{sum}}{P_{sum} + L\sigma^2}$$

$$\sim \operatorname{argmin}_L \sum_{i=F}^{L+F-1} P_i + L\sigma^2 - 2 \sum_{i=F}^{L+F-1} P_i = L\sigma^2 - \sum_{i=F}^{L+F-1} P_i \quad (9A)$$

As evident from above, equation (9A) is simplified by assuming $\alpha=1$, which may imply that hardware or processor may not need to calculate $\alpha$ as well as multiplication of a and other parameters in equation (10). As such, in equation 9A, a division operation (as shown in equation (10)) may be removed, and therefore, the number of multiplication operation in hardware or processor may be reduced. In one embodiment, equation (10) may be computed by a processor.

In one embodiment, the example method and system for DSE may support different RS, and therefore, TRS may be used for embodiments of the example method and system for DSE of the present disclosure.

The following paragraphs discuss in details the derivation of equation (9). For example, in some cases, in the frequency domain, the weight matrix of MMSE channel may be estimated as follows:

$$R_{dp}(R_{pp} + \sigma^2 I)^{-1} = F_h P F^H (FPF^H + \sigma^2 I)^{-1} = \quad (11)$$

$$F_h P F^H F(P + \sigma^2 I)^{-1} F^H = F_h P (P + \sigma^2 I)^{-1} F^H$$

In equation (11), $P=\operatorname{diag}(P_0, P_1, \ldots, P_{N-1})$ is a N×N diagonal matrix, F is a N×N matrix with (i, j)th entry $$(F)_{i,j} = \exp\left(-\frac{j2\pi p_i(j-1)}{N}\right),$$

$F_h$ is a M×N matrix with (i,j)th entry $$(F_h)_{i,j} = \exp\left(-\frac{j2\pi h_i(j-1)}{N}\right).$$

In the above channel weight matrix (e.g., equation (11)), all the N taps in frequency domain may be used to calculate the frequency correlation while in practice only approximately 6 taps are used. Therefore, based on this assumption, in time domain the MMSE weights can be presented as $P_i/(P_i+\sigma^2)$, $i \in \{0, 1, \ldots, N-1\}$. Consequently, the time domain weights for the uniform PDP introduced in equation (5) may be represented as:

$$U'_i = \begin{cases} \frac{1}{L}\left(\frac{1}{L} + \sigma^2\right), & F \leq i \leq F+L-1 \\ 0, & \text{otherwise} \end{cases} \quad (12)$$

Based on the above, the time domain observation of the RS channels may be $\{h_{p0}^{(t)}, h_{p1}^{(t)}, \ldots, h_{pN-1}^{(t)}\}$. In one embodiment, $y_i^t$ may be the observation at tap i and in such a case, $y_i^t$ may be represented as:

$$y_i^{(t)} = h_{pi}^{(t)} + z_i^{(t)} \quad (13)$$

In equation (13), $z_i^t$ is the background noise in time domain, which may be independent to the RS channels and of zero-mean and variance $\sigma^2$.

The optimal uniform PDP to lower or minimize the following mean square error of channel estimation may be:

$$(L_o, F_o) = \operatorname{argmin}_{F,L} E\left\{\sum_{i=0}^{N-1} (U'_i y_i^t - h_{pi}^{(t)})^* (U'_i y_i^t - h_{pi}^{(t)})\right\} \quad (14)$$

s.t.

$$1 \leq L \leq \frac{3N}{4},$$

$$-\frac{N}{4} \leq F \leq \frac{N}{4}.$$

It may be observed that the difference between (8) and (14) is that (14) is for time domain channel. Therefore, based on the above, MSE may be represented as:

$$MSE = E\left\{\sum_{i=0}^{N-1} (U'_i(h_{pi}^{(t)} + z_i^{(t)}) - h_{pi}^{(t)})^* (U'_i(h_{pi}^{(t)} + z_i^{(t)}) - h_{pi}^{(t)})\right\} \quad (15)$$

$$= \sum_{i=0}^{N-1} \{U'_i P_i U'_i + P_i + U'_i \sigma^2 U'_i - 2U'_i P_i\} \quad (16)$$

$$= \sum_{i=0}^{N-1} P_i + \sum_{i=F}^{L+F-1} \left(\frac{\frac{1}{L}}{\frac{1}{L} + \sigma^2}\right)^2 \sigma^2 + \sum_{i=F}^{L+F-1} \{[(U'_i)^2 - 2U'_i]P_i\} \quad (17)$$

$$= 1 + \frac{L\sigma^2}{(1+L\sigma^2)^2} + \left[\frac{1}{(1+L\sigma^2)^2} - \frac{2}{1+L\sigma^2}\right] \sum_{i=F}^{L+F-1} P_i \quad (18)$$

With respect to (16), $P_i = E(h_{pi}^{(t)*} h_{pi}^{(t)})$ may be used to denote the PDP for RS REs channel. Also, $E(z_i^{(t)*} h_{pi}^{(t)}) = E(h_{pi}^{(t)*} z_i^{(t)}) = 0$, because noise may be independent with channels.

With respect to (18), due to the uniform power is constraint $\Sigma_{i=0}^{N-1} P_i = 1$.

Therefore, in order to minimize (or reduce) the time domain channel mean square error, an optimal $$F, -\frac{N}{4} \leq F \leq \frac{N}{4}, \text{ and } L, 1 \leq L \leq \frac{3N}{4},$$

may be determined, so that equation (9) may be minimized.

The optimal uniform PDP, e.g., as discussed with respect to equations (13) to (18), may be based on PDP estimated from RS channel observations. Because the sample duration in the PDP domain (as discussed with respect to equations

(13) to (18)) is different from the sample duration of time domain signal for data REs, e.g., $$\text{Sample duration of } RS \ REs' \ PDP = \frac{1}{BW_{RS}} = \frac{1}{N_{PDP} \times \Delta f \times \frac{12}{\rho}} \quad (19)$$

In equation (19), $\rho$ is the density of RS REs; and $$\text{Sample duration of data } REs' \ PDP = \frac{1}{BW_{system}} = \frac{1}{N_{FFT} \times \Delta f} \quad (20)$$

Therefore, in order to use the uniform PDP in FD-MMSE CE, the sample duration of PDP may be converted into data RE channels' sample duration.

In some cases, a directly sample time conversion for estimated PDP may be complicated. Since the aim of the embodiments of the example method and system for DSE of the present disclosure is to find a uniform PDP to replace the real PDP, an alternative way is to perform the sample time conversion for the uniform PDP.

The uniform PDP used to calculate the frequency correlation after the sample time conversation may be assumed to have an FAP index F' and a length L', which may be represented as follows:

$$F' = \text{scaling factor} \times F, \quad (21)$$

$$L' = \text{scaling factor} \times L, \quad (22)$$

In equations (21) and (22), the scaling factor may be calculated as:

$$\text{scaling factor} = \frac{\text{Sample duration of } RS \ PDP}{\text{Sample duration of data } REs} = \frac{N_{IFFT} \times \Delta f}{N_{PDP} \times \Delta f \times \frac{12}{\rho}} \quad (23)$$

In equation (23), $N_{IFFT}$ may be the size of Fast Fourier Transform (FFT) in the example system and $N_{PDP}$ may be the length of the estimated PDP (e.g., input of the example method for DSE).

Figure 2A:
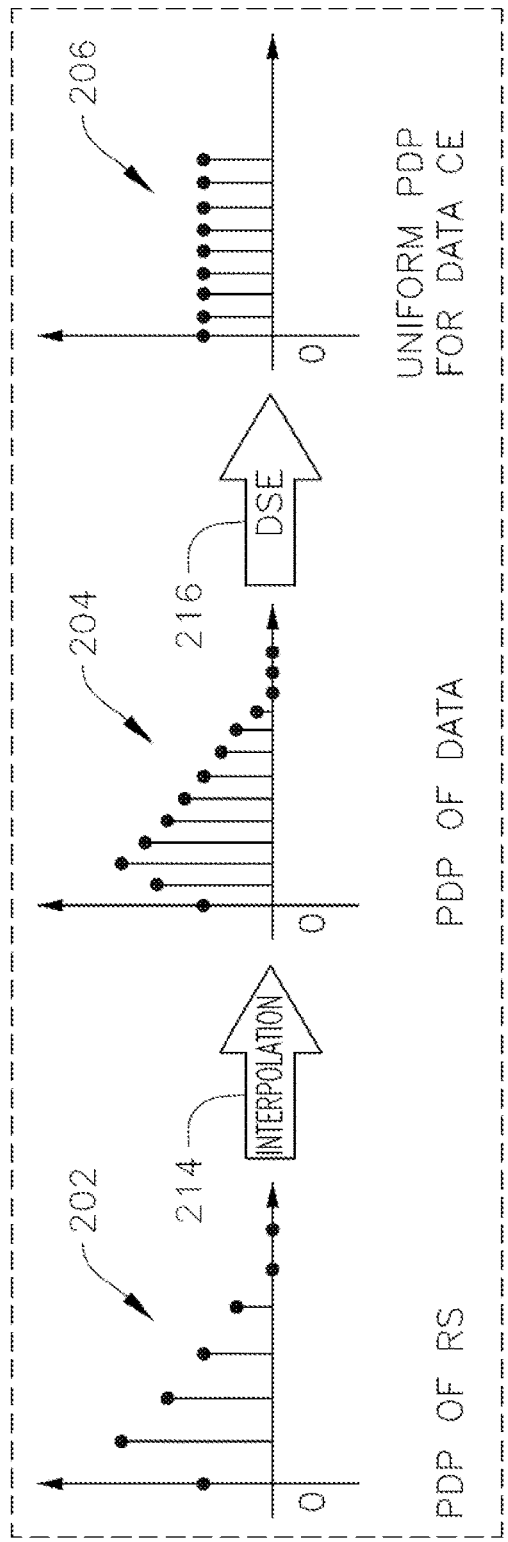
FIGS. 2A-2B illustrate examples of different sample time conversion schemes, according to one example embodiment of the present disclosure.
Figure 2B:
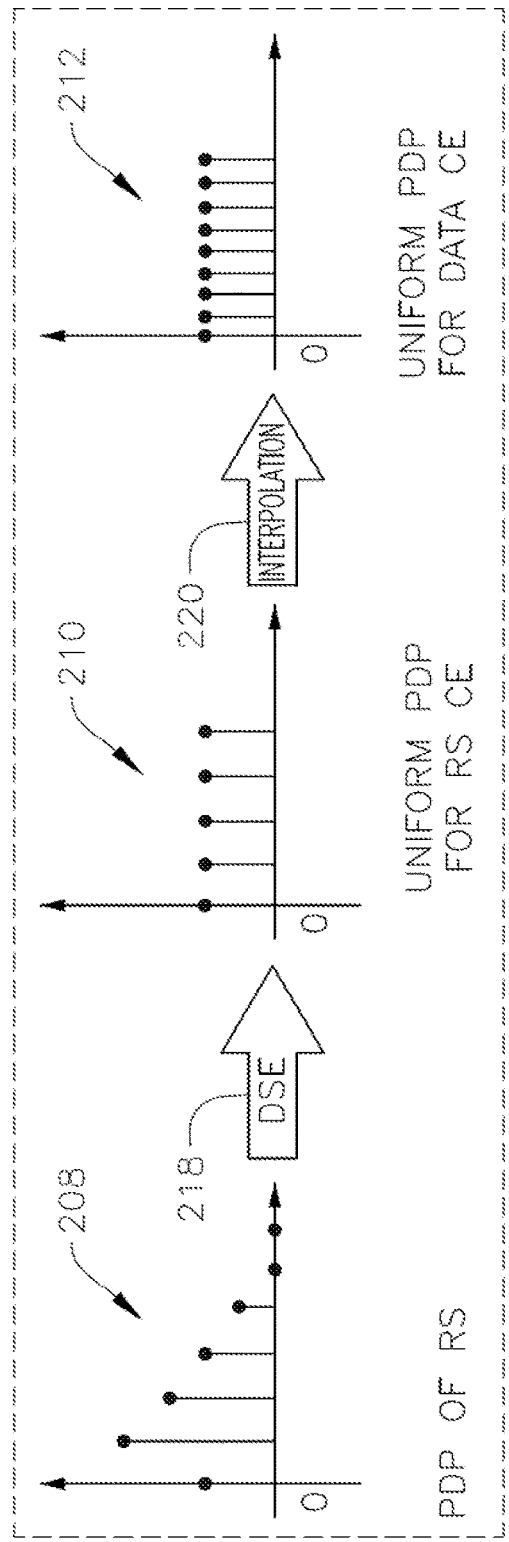

FIGS. 2A-2B illustrate examples of different sample time conversion schemes. For example, in one embodiment, as discussed above, a directly sample time conversion for estimated PDP may be complicated as shown in FIG. 2A. For example, 202 of FIG. 2A, may represent the PDP of RS, 204 of FIG. 2A may represent the PDP of data, and 206 of FIG. 2A may represent the uniform PDP for data CE. The PDP of data, as shown in 204 of FIG. 2A, may be obtained by performing an interpolation 214 over the PDP of RS, as shown in 202 of FIG. 2A. Also, the uniform PDP for data CE, as shown in 206 of FIG. 2A, may be obtained by obtaining a DSE 216 of the PDP of data, as shown in 204 of FIG. 2A. According to one example embodiment, by utilizing the example method and system for DSE, a uniform PDP may be determined to replace the real PDP, a sample equivalent way may be to perform the sample time conversion for uniform PDP. For example, 208 of FIG. 2B, may represent the PDP of RS, 210 of FIG. 2B may represent the uniform PDP for RS CE, and 212 of FIG. 2B may represent the uniform PDP for data CE. The uniform PDP for RS CE, as shown in 210 of FIG. 2B, may be obtained by obtaining a DSE 218 of the PDP of RS, as shown in 208 of FIG. 2B. Also, the uniform PDP for data CE, as shown in 212 of FIG. 2B, may be obtained by performing an interpolation 220 over the uniform PDP for RS CE, as shown in 210 of FIG. 2B.

The example method and system for DSE may obtain the optimal delay spread value to minimize the MSE of channel estimation (CE). The example method and system for DSE may provide the optimal F and L that may minimize or reduce the MSE between the estimated channel and the ideal channel using uniform PDP (as discussed with respect to equation (8)). Exhaustively searching F and L using the metric function in equation (8) may be one mechanism. However, such an approach may be computationally expensive because matrix inverse may be utilized for each hypothesis of F and L. In order to reduce complexity, channel mean square error may be computed by assuming a FD-MMSE CE is done using a uniform PDP.

With the above approximation, the optimization discussed with respect to equation (8) may eventually become the optimization as shown in equation (9). As discussed with respect to equation (9), equation (10), and equation (9A), that the computation for each hypothesis of F and L becomes much less using the equations (9), (10), or (9A).

Figure 3:
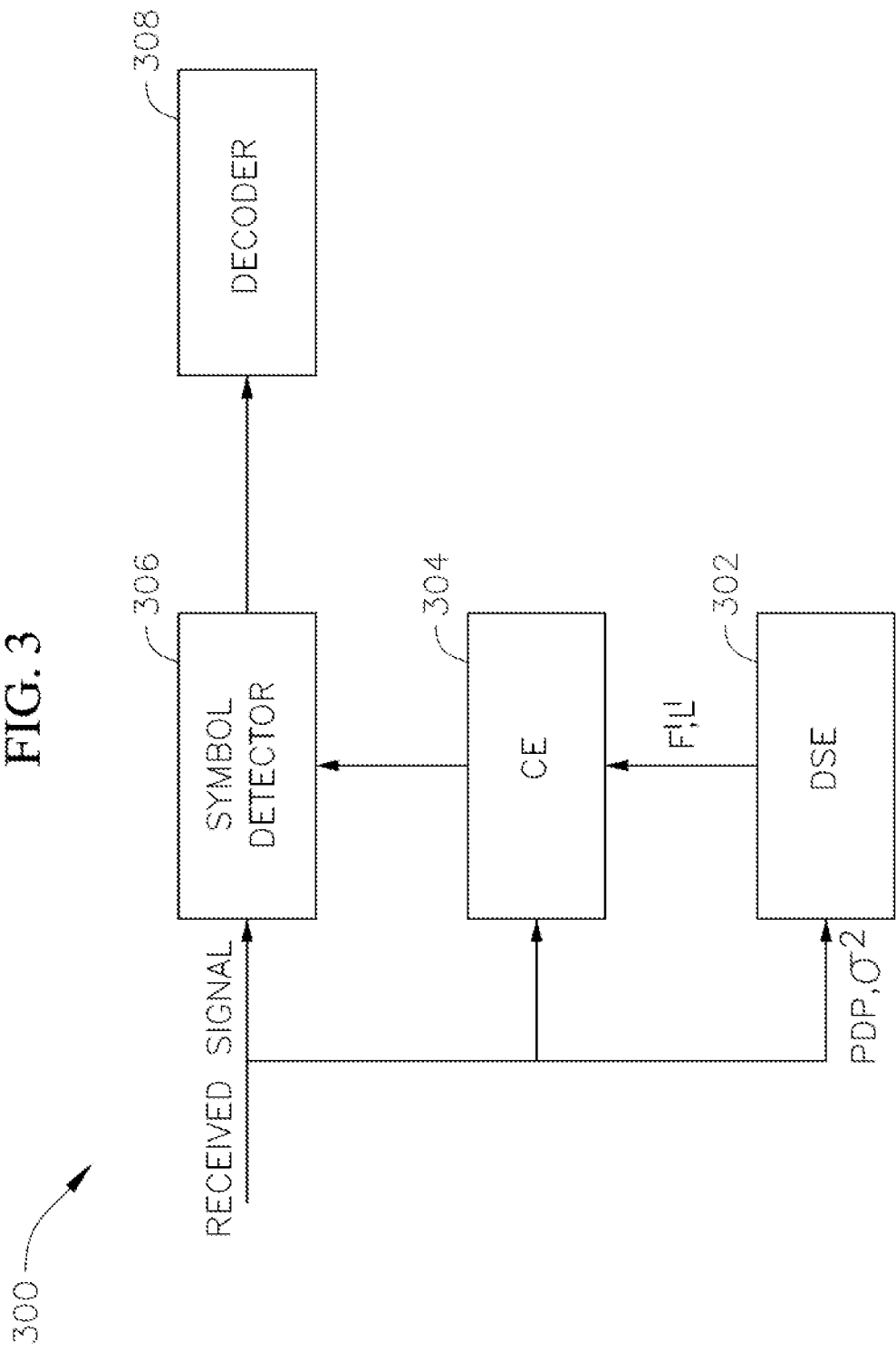
FIG. 3 illustrates a block diagram representation of an example system, according to one example embodiment of the present disclosure.

FIG. 3 illustrates a block diagram representation of an example system 300 to implement the example method for DSE of the present disclosure. The example system 300 includes a DSE module 302, a CE module 304, a symbol detector module 306, and a decoder module 308. The system 300 may be inside a user equipment (UE) (e.g., a smart phone, a tablet, and a computer).

In one embodiment, the DSE module 302 may receive an estimated noise variance $\alpha^2$ and an estimated PDP (e.g., $P_i$) from a time domain RS channel estimation and may use the example DSE method to calculate an FAP index F' and a length L' (e.g., delay spread) in time domain. The output F' and L' from the DSE module 302 may be used to calculate CE (e.g., as discussed with respect to equations (6), (7), and (8)) in the CE module 304. For example, in one embodiment, the F' and L' may automatically determine an optimal uniform PDP used in the CE module 304 to calculate correlation matrices in equation (7) (e.g., not only between RS channels and data RE channels).

The output from the CE module 304 may be used in the symbol detector module 306 along with a received signal. The output from the symbol detector module 306 may be transferred to the decoder module 308.

Figure 4:
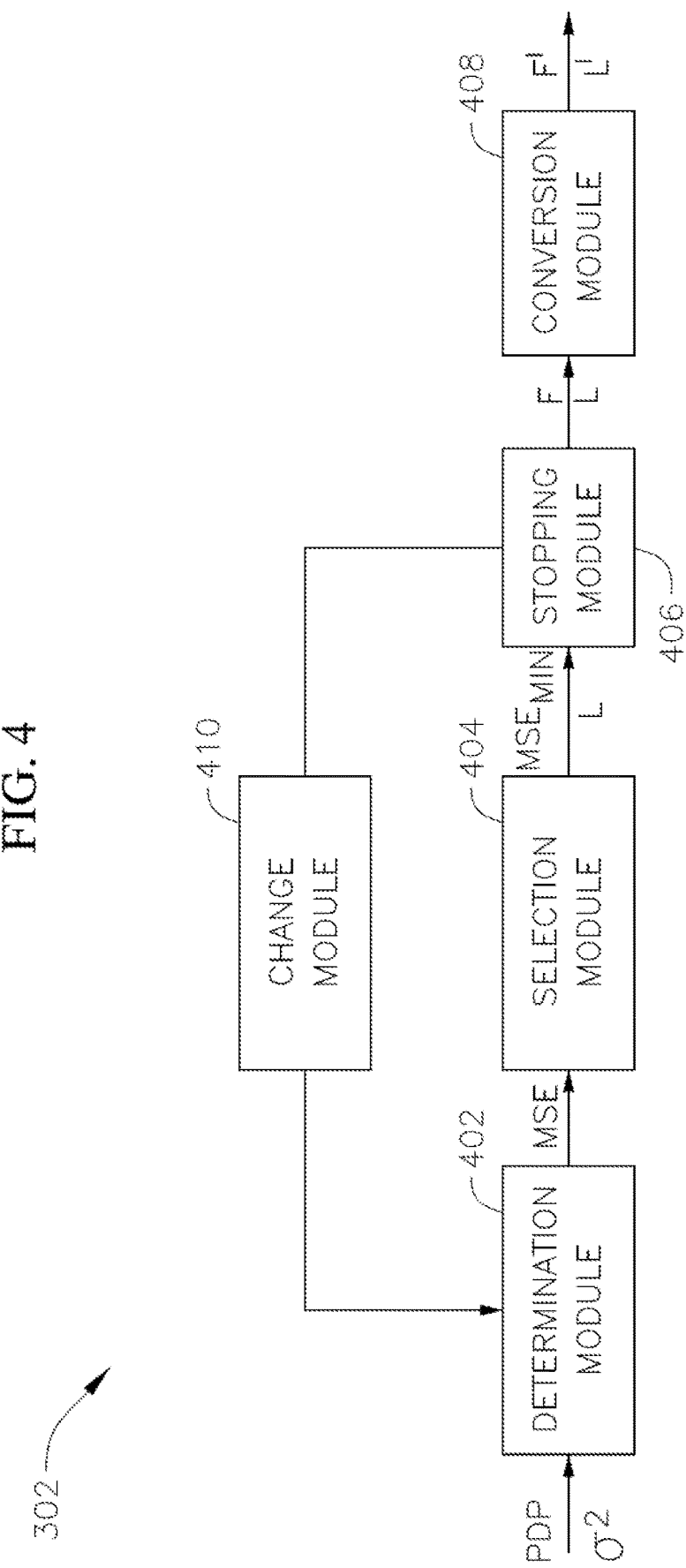
FIG. 4 illustrates another block diagram representation of an example system for DSE, according to one example embodiment of the present disclosure.

FIG. 4 illustrates another block diagram representation of an example system for DSE of the present disclosure. For example, FIG. 4 illustrates a detailed block diagram of the DSE module 302 of FIG. 3.

In one embodiment, the determination module 402 may receive an estimated noise variance $\sigma^2$ and an estimated PDP (e.g., $P_i$) from time domain RS channel estimation. At FAP index F=0 (e.g., when a value '0' is assigned to F), a length L (e.g., delay spread) may be determined using a calculation metric (e.g., equation (9) or (18)) that may minimize the time domain MSE using estimated noise variance $\sigma^2$ and the estimated uniform PDP from the time domain RS channel estimation. The estimated noise variance $\sigma^2$ may be capped at a desired maximum SNR or the DSE may stop at a desired power cap. For example, the maximum SNR may be limited to 20 dB when estimating delay spread.

In one embodiment, in both directions $$F < 0 \ \left(\text{e.g., } -\frac{N}{4} \leq F < 0\right) \text{ and } F > 0 \ \left(\text{e.g., } 0 < F \leq \frac{N}{4}\right),$$

the optimal value of L that minimizes MSE for each F may be determined, as shown with respect to the selection module 404 and the change module 410.

In one embodiment, a search for the optimal value of F and the optimal value of L in each direction may be stopped if the minimized MSE increases as modulus F increases for n (e.g., n=5) consecutive times, as shown with respect to the stopping module 406 and the change module 410.

In one embodiment, an optimal F and corresponding L may be determined based on comparing all the minimized MSEs (e.g., output from the stopping module 406).

In one embodiment, the determined optimal value of F and the optimal value of L may be scaled based on the difference of sampling time between the RS and the data REs (e.g., using equation (21) and (22)), as shown with respect to a conversion module 408. The output F' and L' from the conversion module 408 may be used to calculate the CE and the frequency correlation, as discussed with respect to equations (6), (7), and (8).

Figure 5A:
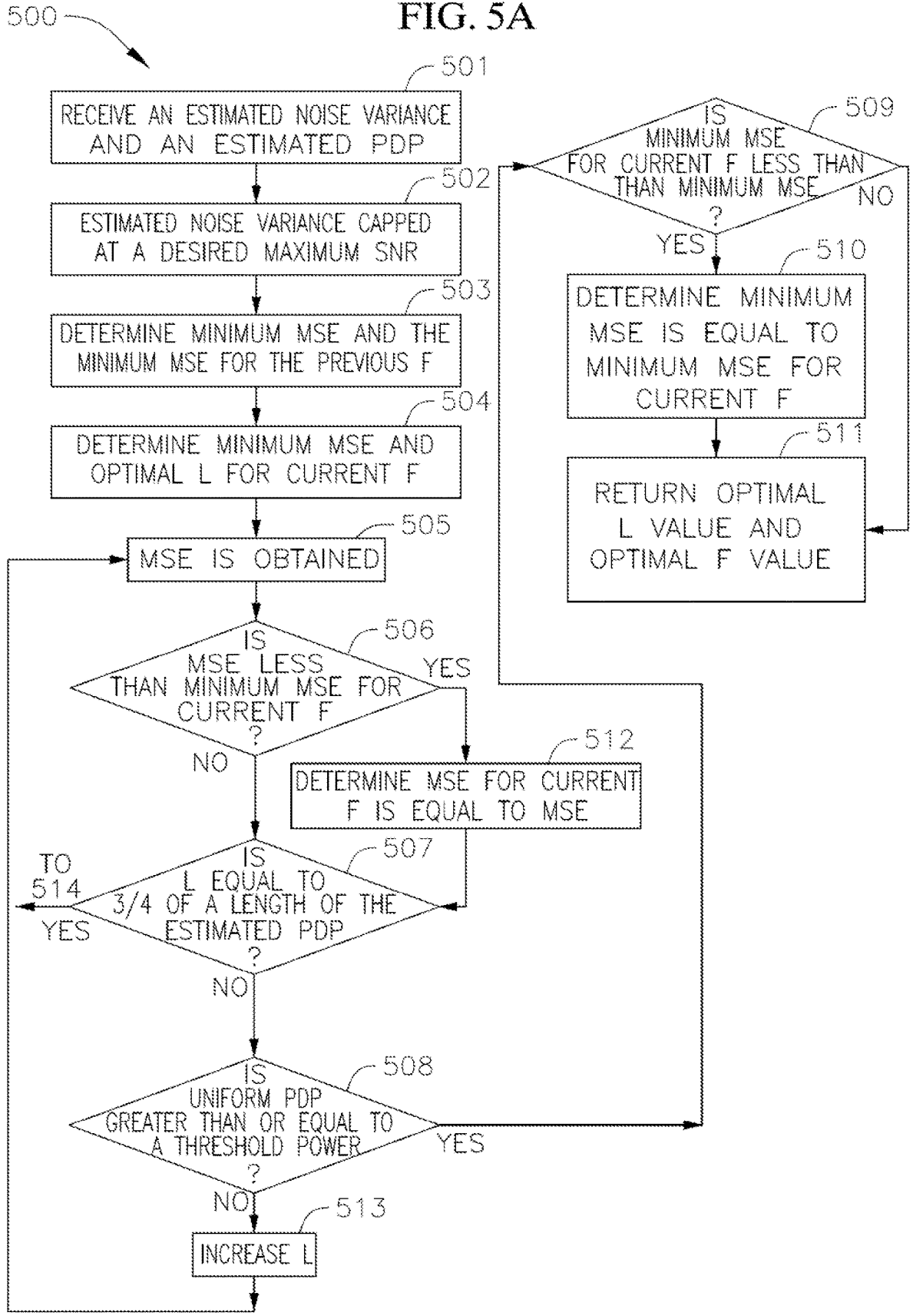
FIGS. 5A-5B illustrate a flow chart illustrating an example method for DSE, according to one example embodiment of the present disclosure.
Figure 5B:
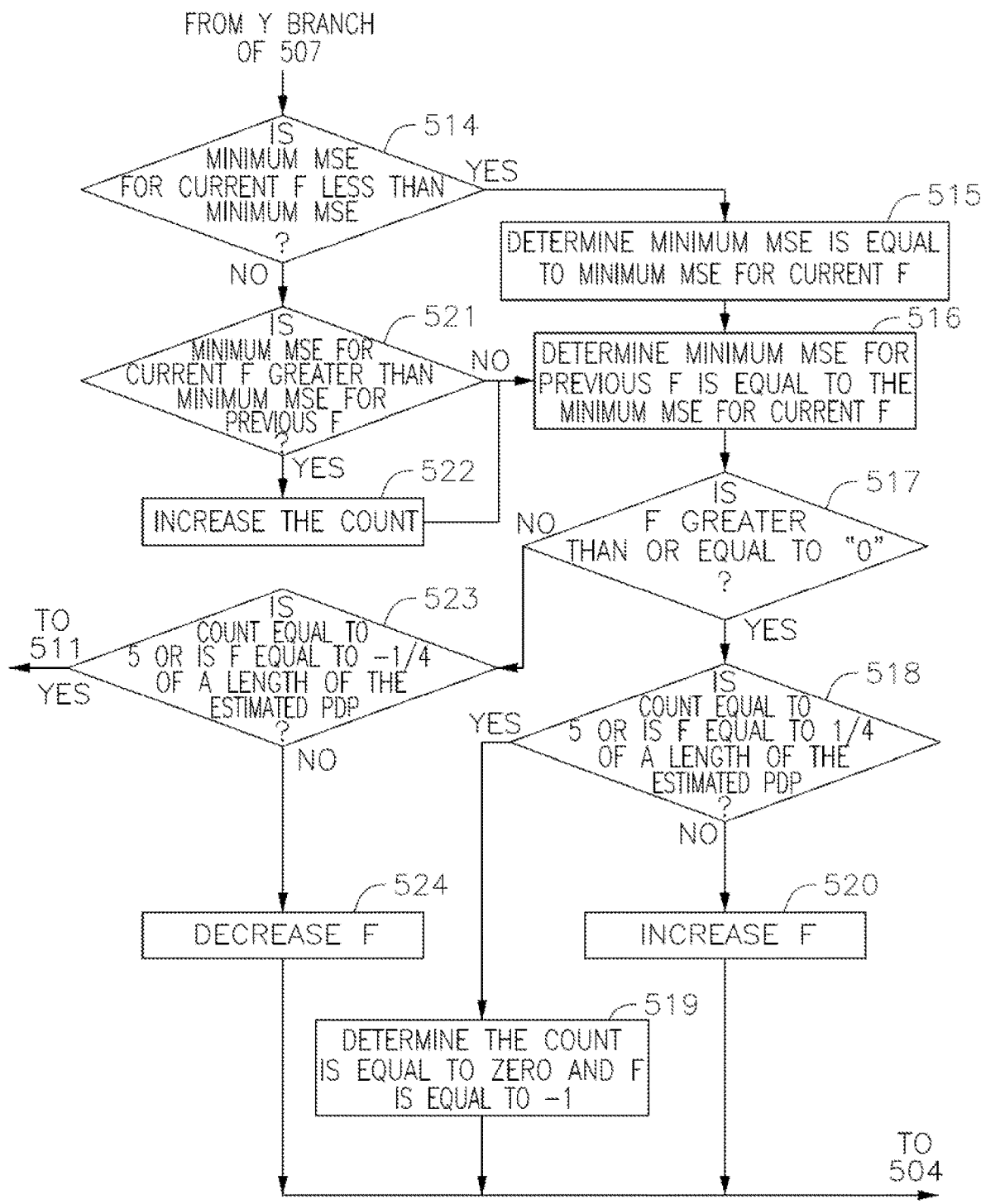

FIGS. 5A-5B illustrate a flow chart illustrating the example method for DSE of the present disclosure. The method of FIGS. 5A-5B may be implemented in the DSE module 302 of FIG. 3 or the method of FIGS. 5A-5B may be implemented in modules 402, 404, 406, and 410 of FIG. 4. For example, the method 500 of FIGS. 5A-5B may determine an optimal FAP index F and an optimal L (e.g., delay spread) to minimize the time domain mean square error of channel estimation (as shown in equation (18)). For example, FIGS. 5A-5B illustrate an overall flow chart of the example method for DSE of the present disclosure combined with the SNR and power cap approaches.

At 501, an example DSE system of the present disclosure (e.g., the DSE module 302 of FIG. 3 or the determination module 402 of FIG. 4) may receive an estimated noise variance $\sigma^2$ and an estimated PDP (e.g., $P_i$) from a time domain RS channel estimation.

At 502, the example DSE system of the present disclosure (e.g., the DSE module 302 of FIG. 3) may cap the estimated noise variance $\sigma^2$ at a desired maximum SNR, for example, 20 dB.

At 503, the example DSE system of the present disclosure (e.g., the DSE module 302 of FIG. 3) may assign a value "0" to the FAP index F, i.e., F=0. At 503, the example DSE system of the present disclosure (e.g., the DSE module 302) may determine the minimum MSE to be equal to 1 and the minimum MSE for the previous F to be equal to 100 (F=0, cnt=0, $MSE_{min}$=1, $MSE_{min\_prev\_F}$=100).

At 504, for L=1, the example DSE system of the present disclosure (e.g., the determination module 402 of FIG. 4 or DSE module 302 of FIG. 3) may determine minimum MSE for current F to be equal to 100 and optimal L for current F to be equal to −1 (L=1, $MSE_{min\_cur\_F}$=100, $L_{opt,\,F}$=−1).

At 505, the example DSE system of the present disclosure (e.g., the determination module 402 of FIG. 4 or the DSE module 302 of FIG. 3) may determine the MSE using equation (18):

$$MSE = 1 + \frac{L\sigma^2}{(1+L\sigma^2)^2} + \left[\frac{1}{(1+L\sigma^2)^2} - \frac{2}{1+L\sigma^2}\right]\sum_{i=F}^{L+F-1} P_i \quad (18)$$

At 506, the example DSE system of the present disclosure (e.g., the determination module 402 of FIG. 4 or the DSE module 302 of FIG. 3) may determine if the calculated MSE at 505 is less than $MSE_{min\_cur\_F}$ (e.g., $MSE_{min\_cur\_F}$=100) from 504.

However, in one embodiment, in 506, $MSE_{min\_cur\_F}$ may not be a fixed value (e.g., 100). For example, in one embodiment, each time when the method 500 returns to 506 from 513 through 505, $MSE_{min\_cur\_F}$ may change in 512. Therefore, in one embodiment, when 506 is executed for the first time, $MSE_{min\_cur\_F}$ may have the value 100.

If at 506, it is determined that the calculated MSE at 505 is not less than $MSE_{min\_cur\_F}$ (e.g., $MSE_{min\_cur\_F}$=100) from 504, at 507, the example DSE system of the present disclosure (e.g., the selection module 404 of FIG. 4 or the DSE module 302 of FIG. 3) may determine if a L (e.g., length of uniform PDP $P_i$) is equal to $\frac{3}{4}N_{PDP}$, because to satisfy the time domain MSE of channel estimation (as discussed with respect to equation (18)) the condition $$1 \leq L \leq \frac{3N}{4}$$

needs to be satisfied.

If at 506, the example DSE system of the present disclosure (e.g., the determination module 402 of FIG. 4 or the DSE module 302 of FIG. 3) determine that the calculated MSE at 505 is less than $MSE_{min\_cur\_F}$, at 512, the example DSE system of the present disclosure (e.g., the determination module 402 of FIG. 4 or DSE module 302 of FIG. 3) may determine that the $MSE_{min\_cur\_F}$ is equal to MSE (determined from 505) and $L_{opt,\,F}$=L. From 512, the method proceeds to 507.

If at 507, the example DSE system of the present disclosure (e.g., the selection module 404 of FIG. 4 or the DSE module 302 of FIG. 3) determines that the L (e.g., length of uniform PDP $P_i$) is not equal to $\frac{3}{4}N_{PDP}$, at 508, the example DSE system of the present disclosure (e.g., the stopping module 406 of FIG. 4 or DSE module 302 of FIG. 3) may determine if $\sum_{i=F}^{L+F-1} P_i \geq$ Thr_pwr. Thr_pwr may be based on the estimated noise variance. For example, if SNR≤10, Thr_pwr=1 (no power cap). However, if SNR>10, Thr_pwr=1−$\sigma^2$*N/2.

If at 508, it is determined that $\sum_{i=F}^{L+F-1} P_i \geq$ Thr_pwr, at 509, the example DSE system of the present disclosure (e.g., the DSE module 302 of FIG. 3) may determine if $MSE_{min\_cur\_F} < MSE_{min}$.

However, if at 508, it is determined that $\sum_{i=F}^{L+F-1} P_i \not\geq$ Thr_pwr, at 513, the example DSE system of the present disclosure (e.g., the determination module 402 of FIG. 4) may increase the value of L and the method returns to 505.

If at 509, it is determined that $MSE_{min\_cur\_F} < MSE_{min}$, at 510, the example DSE system of the present disclosure (e.g., the DSE module 302 of FIG. 3) may determine that the $MSE_{min}$=$MSE_{min\_cur\_F}$ $F_{opt}$=F, and $L_{opt}$=$L_{opt,F}$. The search for the optimal L ($L_{opt}$) value and optimal F ($F_{opt}$) value may be stopped.

At 511, optimal L ($L_{opt}$) and optimal F ($F_{opt}$) values are returned. These values may be sent to an internal block (e.g., conversion module 408 of FIG. 4) of the example DSE system of the present disclosure.

If at 509, it is determined that $MSE_{min\_cur\_F}$ is not less than $MSE_{min}$, the method proceeds to 511.

On the other hand, if at 507, it is determined that the L (e.g., length of uniform PDP $P_i$) is equal to $\frac{3}{4}N_{PDP}$, at 514, the example DSE system of the present disclosure (e.g., the selection module 404 of FIG. 4) may determine if $MSE_{min\_cur\_F} < MSE_{min}$. If so, at 515, the example DSE system of the present disclosure (e.g., the selection module 404 of FIG. 4) may determine that the $MSE_{min}=MSE_{min\_cur\_F}$, $F_{opt}=F$, $L_{opt}=L_{opt,F}$. From 515, the method proceeds to 516.

However, if at 514, it is determined that $MSE_{min\_cur\_F}$ is not less than $MSE_{min}$, at 521, the example DSE system of the present disclosure (e.g., the change module 410 of FIG. 4) may determine if the $MSE_{min\_cur\_F} > MSE_{min\_prev\_F}$ (minimum MSE for the previous value of F). If so, the example DSE system of the present disclosure (e.g., the change module 410 of FIG. 4) may increase the count cnt at 522. Otherwise, from 521, the method proceeds to 516. From 522, the method proceeds to 516.

At 516, the example DSE system of the present disclosure (e.g., the selection module 404 of FIG. 4) may determine that the $MSE_{min\_prev\_F}=MSE_{min\_cur\_F}$.

At 517, the example DSE system of the present disclosure (e.g., the change module 410 of FIG. 4) may determine if F>0. If so, at 518, the example DSE system of the present disclosure (e.g., the change module 410 of FIG. 4) may determine if the count cnt==5 or F If so, from 518 the method proceeds to 519. At 519, the example DSE system of the present disclosure (e.g., the change module 410 of FIG. 4) may determine the count cnt==0 and F=−1. Otherwise, from 518, the method proceeds to 520, where the example DSE system of the present disclosure (e.g., the change module 410 of FIG. 4) may increase the value of F.

If at 517, if it is determined that F is not greater than or equal to 0, the method proceeds to 523. At 523, the example DSE system of the present disclosure (e.g., the stopping module 406 of FIG. 4) may determine if the count cnt==5 or F=−¼N. If so, the method proceeds to 511.

Otherwise, the method proceeds to 524, where the example DSE system of the present disclosure (e.g., the DSE module 302 of FIG. 3) may decrease the value of F.

From 524, 519, and 520 the method proceeds to 504.

The output from the method of FIGS. 5A-5B are the optimal value of L ($L_{opt}$) and the optimal value of F ($F_{opt}$), which are sent to an internal block of the example DSE system of the present disclosure (e.g., the conversion module 408 of FIG. 4). In the internal block of the example DSE system of the present disclosure (e.g., the conversion module 408), the optimal value of L (L opt) and the optimal value of F ($F_{opt}$) received from another internal block of the example DSE system of the present disclosure (e.g., the stopping module 406 of FIG. 4) may be scaled based on the difference of sampling time between RS and data REs (e.g., using equation (21) and (22)). The output F' and L' from example DSE system of the present disclosure (e.g., the conversion module 408) may be used to calculate CE and frequency correlation, as discussed with respect to equations (6), (7), and (8), in the CE module 304 of FIG. 3.

In example embodiments, the example method for DSE (as discussed with respect to FIGS. 5A-5B) may introduce two parameters L and F. Because exhausted search on F and L may not efficient, the complexity of the example method for DSE (as discussed with respect to FIGS. 5A-5B) may be reduced compared to the alternative methods, since in the example method for DSE (as discussed with respect to FIGS. 5A-5B), the optimal F may be near value 0.

The implementation details of the example method for DSE (as discussed with respect to FIGS. 5A-5B) may be as follows.

The implementation of the example method for DSE (as discussed with respect to FIGS. 5A-5B) may effectively and efficiently obtain the optimal DSE value in low SNR regime. However, in high SNR regime, the obtained DSE may be longer than the last channel taps because weak "ghost" taps shown in PDP estimation (caused by PDP estimation error and noise). Two heuristic patches are used in some embodiments of the example method for DSE (as discussed with respect to FIGS. 5A-5B) to prevent or reduce the increase of the delay spread in such scenarios.

Because, this DSE extension may happen when SNR is high, the maximum SNR may be limited to some threshold value, for example, 20 dB (e.g., in the example method for DSE (as discussed with respect to FIGS. 5A-5B)) when estimating delay spread.

In order to further improve the performance, a power cap approach may be used for the example method for DSE (as discussed with respect to FIGS. 5A-5B). For example, when calculating equation (18), if for any L and F, $\Sigma_{i=F}^{L+F-1} P_i \geq Thr\_pwr$, the example method for DSE (as discussed with respect to FIGS. 5A-5B) may stop searching and return the optimal L and F value. Thr_pwr may be based on the estimated noise variance. For example, if SNR≤10, Thr_pwr=1 (No power cap). However, If SNR>10, $Thr\_pwr=1-\sigma^2*N/2$.

Figure 7:
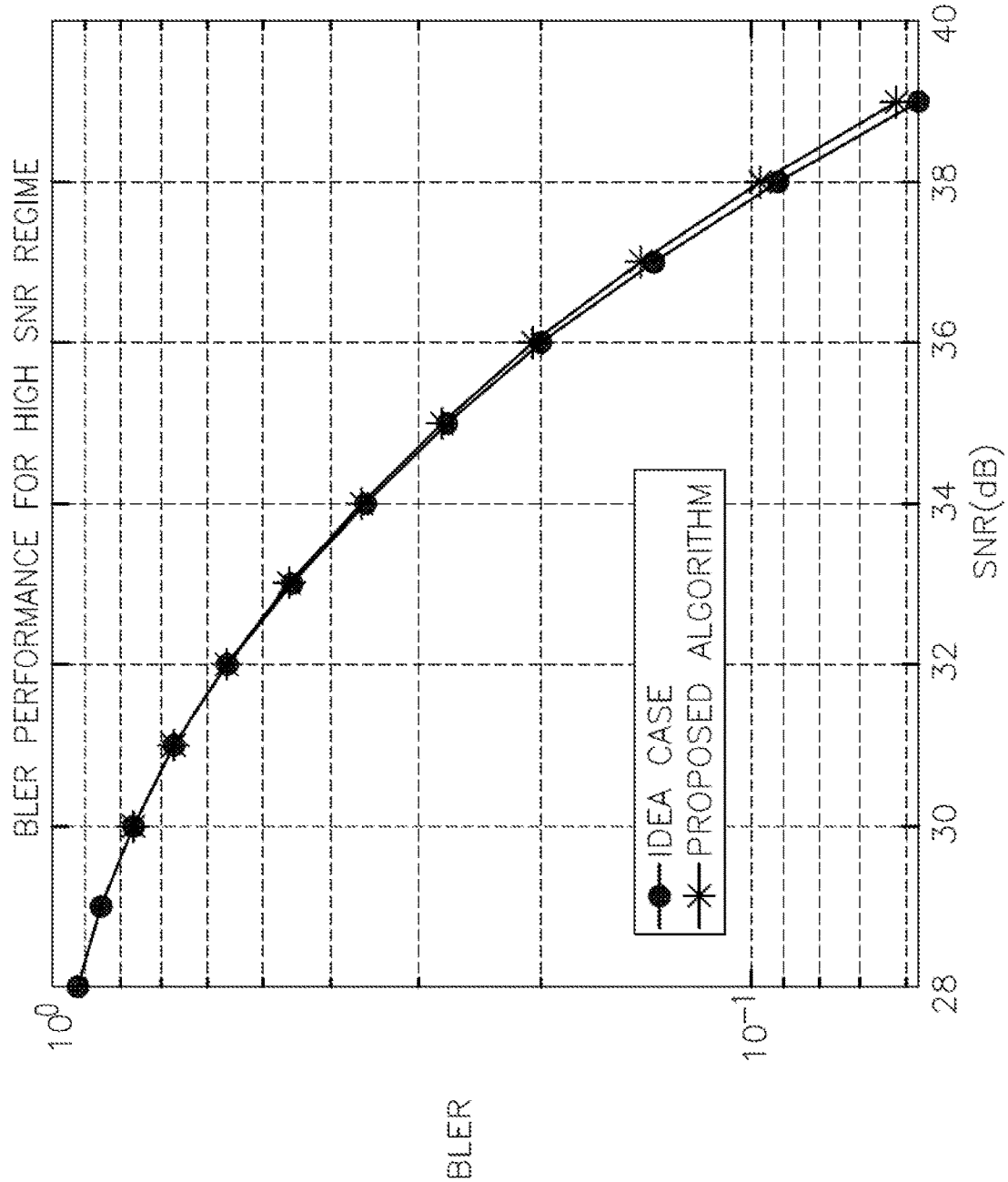
FIG. 7 illustrates the BLER performance in high SNR regime, according to one example embodiment of the present disclosure.

FIG. 6 illustrates the BLER performance in low SNR regime and FIG. 7 illustrates the BLER performance in high SNR regime. For example, as evident from FIG. 6 and FIG. 7, the example method may provide similar performance as the ideal case assuming ideal knowledge of delay spread.

Therefore, the example method for DSE (as discussed with respect to FIGS. 5A-5B) may measure the delay spread from the estimated PDP and the noise variance estimated in wideband CE of TRS. Through a time domain interpretation of the frequency correlation, the example method for DSE (as discussed with respect to FIGS. 5A-5B) may be able to provide an optimal delay spread value that may reduce or minimize the mean square error if the uniform PDP is used for FD-MMSE channel estimation.

In one embodiment, in the example method for DSE (as discussed with respect to FIGS. 5A-5B), the searching step size of F and L may be larger than 1. In such a case, the starting index of F may be non 0, and the stopping criteria of F may be a value that is not 5.

Also, the example method for DSE (as discussed with respect to FIGS. 5A-5B) may not only be applied to the uniform PDP, but also may be applied widely to other types of PDP, for example, an uniform PDP with sparsity.

In case of uniform PDP with sparsity, it may be assumed that a uniform PDP with length N and sparse factor α. In one embodiment, a may be any positive integer that satisfies $$\alpha(L-1) < \frac{3N}{4}.$$

So the none zero entries are from index F to F+α(L−1), i.e., a PDP with entries $\{P_i'\}$, $\forall i \in \{F, F+1, \ldots, F+\alpha(L-1)\}$ where $$P_i' = \begin{cases} 1/L, & i = F + \alpha k, 0 \leq k \leq L-1 \\ 0, & \text{otherwise} \end{cases} \quad (26)$$

In equation (26), k, F and L are integers $$F \in \left\{-\frac{N}{4}, \ldots, \frac{N}{4}\right\}, \alpha L \in \left\{1, \ldots, \frac{3N}{4}\right\}.$$

The uniform PDP as discussed earlier in this paper may be a special case for sparse uniform PDP when α=1.

In one embodiment, the time domain MMSE weights as discussed with respect to the equation (12) for this sparse uniform PDP may be represented as:

$$U'_i = \begin{cases} \frac{1}{L}\left(\frac{1}{L}+\sigma^2\right), & i = F + \alpha k, 0 \le k \le L-1 \\ 0, & \text{otherwise} \end{cases} \quad (27)$$

By using (27) in to (15), the optimal sparse uniform PDP may be obtained from the following optimization:

$$\underset{F,L,\alpha}{\operatorname{argmin}}\ 1 + \frac{L\sigma^2}{(1+L\sigma^2)^2} + \left[\frac{1}{(1+L\sigma^2)^2} - \frac{2}{1+L\sigma^2}\right]\sum_{k=0}^{L-1} P_{F+\alpha k} \quad (28)$$

s.t.

$$1 \le \alpha L \le \frac{3N}{4},$$

$$-\frac{N}{4} \le F \le \frac{N}{4}.$$

In this example case, the optimal delay spread value is $L'=\alpha L+1$. The sparse uniform PDP may need a sample time conversion. When $\alpha>1$, there are multiple ways to do the interpolation. For example, similar to equations (21)-(22), in this case L"=scaling factor×L', where the scaling factor can be calculated by equation (23).

The only difference between (18) and (28) is the accumulated sum calculation. So it can be implemented in a same way as discussed above with respect to equation (18) with an additional searching layer for $\alpha$. The implementation details can be summarized into following steps. For example, starting with $\alpha=1$; assuming F=0, using (28) with estimated noise variance $\sigma^2$ to find L to minimize MSE(F=0). Starting from two directions, i.e., F<0 and F>0, for each F, find the optimal L and MSE. Searching on each direction may stop only if the minimized MSE keep increasing as |F| increasing for consecutively five times. After both direction finish searching, for current $\alpha$, all the MSE values may be compared to find an optimal F and its corresponding L. In one embodiment, if $\alpha$ $$< \frac{3N}{8}, \alpha = \alpha + 1$$

and the method may start over assuming $\alpha=1$. Further, the minimized MSE values may be compared corresponding to all the $\alpha$, output the optimal $\alpha$ and its corresponding F and L.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although exemplary embodiments of system and method for providing first arrival path (FAP) and delay spread estimation (DSE) in wireless communication system have been specifically described and illustrated herein, many modifications and variations will be apparent to those skilled in the art. Accordingly, it is to be understood that a system and method for providing first arrival path (FAP) and delay spread estimation (DSE) in wireless communication system constructed according to principles of this disclosure may be embodied other than as specifically described herein. The present disclosure is also defined in the following claims, and equivalents thereof.

What is claimed is:

1. A method for minimizing a time domain mean square error (MSE) of channel estimation (CE), the method comprising:
    estimating, by a processor, a power delay profile (PDP) from a time domain observation of reference signal (RS) channels;
    estimating, by the processor, a noise variance of the RS channels;
    determining, by the processor, a first arrival path (FAP) value and a delay spread estimation (DSE) value based on the estimated PDP and the estimated noise variance; and
    determining, by the processor, a minimum value of the time domain MSE based on the estimated PDP, the estimated noise variance, and a length of an uniform PDP.

2. A method for minimizing a time domain mean square error (MSE) of channel estimation (CE), the method comprising:
    estimating, by a processor, a power delay profile (PDP) from a time domain observation of reference signal (RS) channels;
    estimating, by the processor, a noise variance of the RS channels; and
    determining, by the processor, a first arrival path (FAP) value and a delay spread estimation (DSE) value based on the estimated PDP and the estimated noise variance for minimizing the MSE of CE, wherein the time domain MSE is:

$$MSE = 1 + \frac{L\sigma^2}{(1+L\sigma^2)^2} + \left[\frac{1}{(1+L\sigma^2)^2} - \frac{2}{1+L\sigma^2}\right]\sum_{i=F}^{L+F-1} P_i \quad (1)$$

wherein F and L are integers, where:

$$1 \leq L \leq \frac{3N}{4}, -\frac{N}{4} \leq F \leq \frac{N}{4}.$$

wherein, $\sigma^2$ is the noise variance, $P_i$ is power of an i-th channel tap or an uniform PDP, F is an index of the FAP, N is a length of the estimated PDP, and L is a length of the uniform PDP.

3. The method of claim 2, wherein determining the FAP value and the DSE value to minimize the time domain MSE comprises determining, by the processor, a value of F and a value of L, wherein a minimum value of the time domain MSE is determined based on the value of F and the value of L.

4. The method of claim 3, wherein the value of L is the delay spread value for minimizing the MSE and the estimated noise variance is capped at a signal to noise ratio (SNR)=20 dB.

5. The method of claim 3, wherein the determining the value of F and the value of L for minimizing the time domain MSE comprises:
    assigning, by the processor, a value "0" to the index of the FAP F;
    determining, by the processor, a minimized value of MSE and corresponding value of L for each F of a plurality of F values within and $$-\frac{N}{4} \leq F < 0 \text{ and } 0 < F \leq \frac{N}{4};$$

determining, by the processor, the value of F and the value of L based on comparing minimized values of MSE for the plurality of F values within $$-\frac{N}{4} \leq F < 0 \text{ and } 0 < F \leq \frac{N}{4}.$$

6. The method of claim 5, wherein the value of F and the value of L correspond to the minimum value of the time domain MSE from among the minimized values of MSE for the plurality of F values within $$-\frac{N}{4} \leq F < 0 \text{ and } 0 < F \leq \frac{N}{4},$$

wherein the minimized values of MSE and the corresponding values of L are determined using equation (1).

7. The method of claim 5, further comprising stopping a search of the value of F and the value of L for F >0 or F<0, by the processor, in response to the minimized value of MSE, for F within $$-\frac{N}{4} \leq F < 0 \text{ or } 0 < F \leq \frac{N}{4},$$

being increased as |F| increased for n consecutive times, wherein the n is 5.

8. The method of claim 5, further comprising scaling, by the processor, the value of F and the value of L based on a difference of sampling time between the RS channels and data resource elements (REs) to determine a scaled value of F and a scaled value of L.

9. The method of claim 8, wherein the scaled value of F is F', wherein F'=scaling factor×F, and the scaled value of L is L', wherein L'=scaling factor×L, wherein $$\text{scaling factor} = \frac{\text{Sample duration of } RS \ PDP}{\text{Sample duration of data } REs} = \frac{N_{IFFT} \times \Delta f}{N_{PDP} \times \Delta f \times \frac{12}{\rho}}$$

wherein $N_{IFFT}$ is a size of Fast Fourier Transform (FFT), $N_{PDP}$ is a length of the estimated PDP, $\Delta f$ is a subcarrier spacing, and p is a density of RS REs.

10. The method of claim 9, wherein the method further comprising:
   determining, by the processor, CE and a frequency correlation between the RS channels and the data REs, based on F' and L'.

11. A system for minimizing a time domain mean square error (MSE) of channel estimation (CE), the system comprising:
   a memory and a processor in communication with the memory, wherein the processor is configured to:
   estimate a power delay profile (PDP) from time domain observation of reference signal (RS) channels;
   estimate a noise variance of the RS channels;
   determine a first arrival path (FAP) value and a delay spread estimation (DSE) value based on the estimated PDP and the estimated noise variance; and
   determine a minimum value of the time domain MSE based on the estimated PDP, the estimated noise variance, and a length of an uniform PDP.

12. The system of claim 11, wherein the time domain MSE is:

$$MSE = 1 + \frac{L\sigma^2}{(1+L\sigma^2)^2} + \left[\frac{1}{(1+L\sigma^2)^2} - \frac{2}{1+L\sigma^2}\right] \sum_{i=F}^{L+F-1} P_i \quad (1)$$

wherein F and L are integers, where:

$$1 \leq L \leq \frac{3N}{4},$$

$$-\frac{N}{4} \leq F \leq \frac{N}{4}.$$

wherein, $\sigma^2$ is the noise variance, $P_i$ is power of an i-th channel tap or the uniform PDP, F is an index of the FAP, N is a length of the estimated PDP, and L is the length of the uniform PDP.

13. The system of claim 12, wherein the processor is further configured to:
   determine the FAP value and the DSE value to minimize the time domain MSE based on determining a value of F and a value of L, wherein the processor is further configured to determine the minimum value of the time domain MSE based on the value of F and the value of L.

14. The system of claim 13, wherein the value of L is the delay spread value for minimizing the MSE and the estimated noise variance is capped at a signal to noise ratio (SNR)=20 dB.

15. The system of claim 13, wherein the processor is further configured to:
   assign a value "0" to the index of the FAP F;
   determine a minimized value of MSE and corresponding value of L for each F of a plurality of F values within arm $$-\frac{N}{4} \leq F < 0 \text{ and } 0 < F \leq \frac{N}{4};$$

determine the value of F and the value of L based on comparing minimized values of MSE for the plurality of F values within $$-\frac{N}{4} \leq F < 0 \text{ and } 0 < F \leq \frac{N}{4}.$$

16. The system of claim 15, wherein the value of F and the value of L correspond to the minimum value of the time domain MSE from among the minimized values of MSE for the plurality of F values within $$-\frac{N}{4} \leq F < 0 \text{ and } 0 < F \leq \frac{N}{4},$$

wherein the minimized values of MSE and the corresponding values of L are determined using equation (1).

17. The system of claim 15, wherein the processor is further configured to stop a search of the value of F and the value of L for F >0 or F<0, by the processor, in response to the minimized value of MSE, for F within $$-\frac{N}{4} \leq F < 0 \text{ and } 0 < F \leq \frac{N}{4},$$

being increased as |F| increased for n consecutive times, wherein the n is 5.

18. The system of claim 15, wherein the processor is further configured to scale the value of F and the value of L based on a difference of sampling time between RS channels and data resource elements (REs) to determine a scaled value of F and a scaled value of L.

19. The system of claim 18, wherein the scaled value of F is F', wherein F'=scaling factor×F, and the scaled value of L is L', wherein L'=scaling factor×L, wherein $$\text{scaling factor} = \frac{\text{Sample duration of } RS\ PDP}{\text{Sample duration of data } REs} = \frac{N_{IFFT} \times \Delta f}{N_{PDP} \times \Delta f \times \frac{12}{\rho}}$$

wherein $N_{IFFT}$ is a size of Fast Fourier Transform (FFT), $N_{PDP}$ is a length of the estimated PDP, $\Delta f$ is a subcarrier spacing, and p is a density of RS REs.

20. The system of claim 19, wherein the processor is further configured to determine CE and a frequency correlation between RS channels and data REs, based on F' and L'.

* * * * *